US005600773A

United States Patent [19]

[11] Patent Number: 5,600,773

Vanover et al.

[45] Date of Patent: Feb. 4, 1997

[54] LOGICAL PARTITIONING OF GAMMA RAMP FRAME BUFFER FOR OVERLAY OR ANIMATION

[75] Inventors: Michael T. Vanover; Linas L. Vepstas; Jeffrey A. Wilkinson, all of Austin, Tex.

[73] Assignee: International Business Machines Corporation, Armonk, N.Y.

[21] Appl. No.: 197,652

[22] Filed: Feb. 16, 1994

Related U.S. Application Data

[63] Continuation of Ser. No. 734,401, Jul. 23, 1991, abandoned.

[51] Int. Cl.[6] ........ G06T 1/00

[52] U.S. Cl. ........ 395/173; 395/131; 395/135; 395/509; 345/199; 345/131; 345/149; 345/122

[58] Field of Search ........ 395/152, 131, 395/135–138, 139, 130, 133, 162–166; 340/725, 726; 382/32, 212; 345/113–115, 122, 127, 131, 149, 150, 152, 153, 155, 186–188, 199; 348/561–567, 581, 585–586, 588–589

[56] References Cited

U.S. PATENT DOCUMENTS

| | | | |
|---|---|---|---|
| 4,783,652 | 11/1988 | Lumelsky | 340/801 |
| 4,825,388 | 4/1989 | Dailey et al. | 395/138 |
| 4,882,683 | 11/1989 | Rupp et al. | 395/165 |
| 4,956,638 | 9/1990 | Larky et al. | 340/701 |
| 4,965,751 | 10/1990 | Thayer et al. | 364/521 |
| 5,029,105 | 7/1991 | Coleman et al. | 395/166 |
| 5,083,257 | 1/1992 | Kennedy | 395/131 |
| 5,163,101 | 11/1992 | Deering | 382/32 |
| 5,179,642 | 1/1993 | Komatsu | 395/135 |

OTHER PUBLICATIONS

IBM Technical Disclosure Bulletin—Three–Buffer Display System For Realtime Animation vol. 3, No. 3 Aug. 1987.

IBM Technical Disclosure Bulletin—Video Subsystem Supporting Multiple Image Planes, Priority and Windowing. vol. 32, No. 4A Sep. 1989.

*Primary Examiner*—Heather R. Herndon
*Assistant Examiner*—Joseph H. Feild
*Attorney, Agent, or Firm*—Casimer K. Salys

[57] ABSTRACT

Methods, systems and programs for partitioning an RGB gamma ramp frame buffer of a workstation into groupings of bit planes to isolate for independent generation the images of multiple objects displayed on a common video screen. According to a preferred practice, groups of bit planes are masked while others are written with scaled and off-set data suitable to represent shaded three-dimensional images. A matching partition of the color palettes in the digital to analog converters ensures consistency in the translation from digital frame buffer data to analog red-green-blue (RGB) color signals. The images as stored in the frame buffer can be arranged in any order of overlay priority. Retention of static image data in a partition reduces the graphics processor load by eliminating the need for regenerating the static component of a complex animation, thereby faciliting real-time motion or user interaction. Losses in color bandwidth resolution are substantially offset through the use of dithering techniques.

8 Claims, 13 Drawing Sheets

| PARTITION NAME | BITS PER PARTITION | R COMP | G COMP | B COMP | NUMBER OF COLORS THAT CAN BE REPRESENTED |
|---|---|---|---|---|---|
| PARTITION A | 2 | | | | 3 X 3 X 3 = 27 COLORS |
| PARTITION B | 1 | | | | 1 X 1 X 1 = 1 COLOR |
| PARTITION C | 3 | | | | 7 X 7 X 7 = 343 COLORS |
| PARTITION D | 2 | | | | 3 X 3 X 3 = 27 COLORS |

A COMPONENT PARTITION THAT IS n BITS DEEP CAN REPRESENT $(2^n-1)^3$ COLORS.

OF THE $2^{3n}$ POSSIBLE NUMERIC VALUES THAT CAN BE STORED IN A COMPONENT PARTITION,
$(2^n-1)^3$ CAN BE USED TO REPRESENT A COLOR
$3 \cdot 2^n \cdot (2^n-1)$ ARE NONSENSE (MEANINGLESS) VALUES
1 REPRESENTS "CLEAR" OR "TRANSPARENT".

COLOR INDEX FRAME BUFFER

PRIOR ART

GAMMA RAMP FRAME BUFFER

PRIOR ART

PRIOR ART
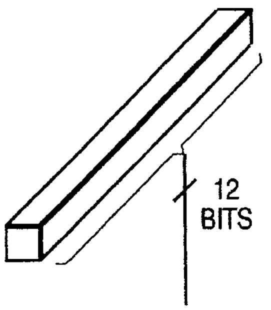
ONE COLOR INDEX PIXEL
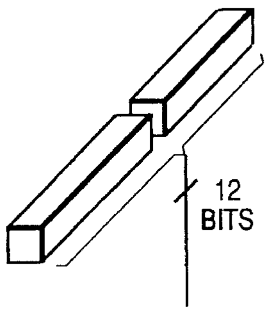
ONE PARTITIONED
COLOR INDEX PIXEL
| PARTITION NAME | BITS PER PARTITION | PIXEL | NUMBER OF COLORS THAT CAN BE REPRESENTED |
|---|---|---|---|
| PARTITION A | 7 | FIRST | 2 - 1 = 127 INDEPENDENT COLORS |
| PARTITION B | 5 | SECOND | 2 - 1 = 31 INDEPENDENT COLORS |
A COLOR INDEX PARTITION THAT IS $n$ BITS DEEP CAN REPRESENT $2^n$-1 LINEARLY INDEPENDENT COLORS (THE $2^n$TH COLOR MUST BE TRANSPARENT).
FIG. 4

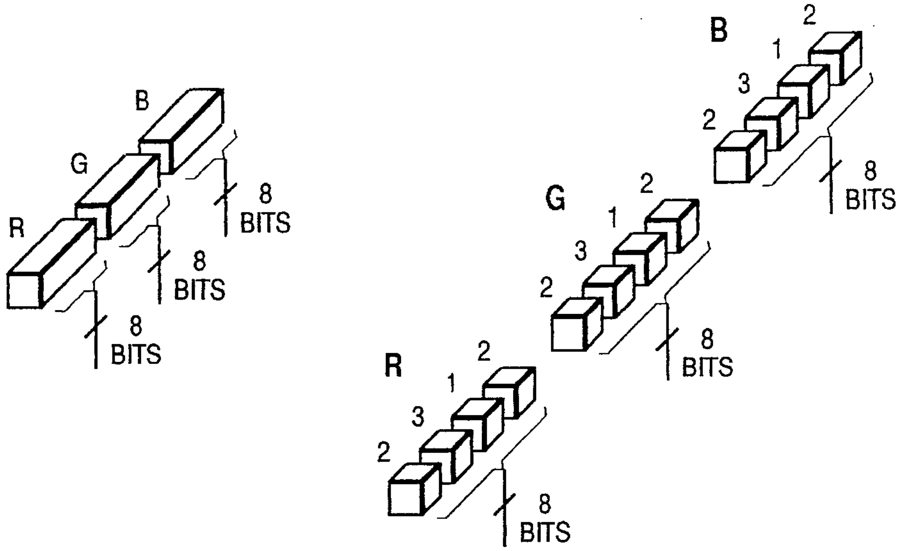

| PARTITION NAME | BITS PER PARTITION | R COMP | G COMP | B COMP | NUMBER OF COLORS THAT CAN BE REPRESENTED |
|---|---|---|---|---|---|
| | | R | G | B | |
| PARTITION A | 2 | | | | 3 X 3 X 3 = 27 COLORS |
| PARTITION B | 1 | | | | 1 X 1 X 1 = 1 COLOR |
| PARTITION C | 3 | | | | 7 X 7 X 7 = 343 COLORS |
| PARTITION D | 2 | | | | 3 X 3 X 3 = 27 COLORS |

A COMPONENT PARTITION THAT IS $n$ BITS DEEP CAN REPRESENT $(2^n-1)^3$ COLORS.

OF THE $2^{3n}$ POSSIBLE NUMERIC VALUES THAT CAN BE STORED IN A COMPONENT PARTITION, $(2^n-1)^3$ CAN BE USED TO REPRESENT A COLOR $3.2^n.(2^n-1)$ ARE NONSENSE (MEANINGLESS) VALUES

1 REPRESENTS "CLEAR" OR "TRANSPARENT".

FIG. 7

FLOW CHART SHOWING HOW A PARTITION IS DEFINED

FLOW CHART SHOWING HOW A PARTITION IS BOUND AT AN INDICATED OFFSET

FLOW CHART SHOWING HOW ALL BUT THE CURRENT PARTITION IS MASKED OFF AND HOW THE CURRENT PARTITION IS INDICATED

FLOW CHART SHOWING HOW TO SET THE CURRENT RENDERING COLOR

KEY TO SYMBOLS USED IN FLOW CHARTS

| | |
|---|---|
| // | indicates a comment follows double-slash |
| $2^n$ | indicates 2 raised to the power n |
| & | indicates a bit-wise AND operation |
| V | indicates a bitwise OR operation |
| NOT | indicates a bitwise NOT operation |
| << | indicates a left-shift operation |
| [ ] | indicates index look-up |
| → | indicates pointer look-up |
| :: = | indicates assignment |

FIG. 14

LOGICAL PARTITIONING OF GAMMA RAMP FRAME BUFFER FOR OVERLAY OR ANIMATION

This is a continuation of application Ser. No. 07/734,401 filed Jul. 23, 1991 now abandoned.

BACKGROUND OF THE INVENTION

The present invention generally relates to color graphics computers and displays. More particularly, the invention is directed to methods, systems and programs for logically partitioning an RGB graphics system of gamma ramp architecture to provide independent storage of multiple shaded color images. The methods, systems and programs are particularly valuable in animation applications, where the use of hardware defined overlays is limited by count or diversity of color.

Personal computers and workstations have evolved from those which generated simple monochrome alphanumeric images on a video display, to those capable of two-dimensional color graphics, and most recently into systems capable of generating three-dimensional color graphics with limited animation. The computational and time burden associated with rendering a complex (non-wire frame) object in fully shaded color is a challenge for all but supercomputers, if animation is desired. The difficulty is attributable to the fact that animation, and in particularly multiple object animation, requires not only that the animated object be regenerated, but also that the background be recreated upon a translation of the animated object or objects. Consequently, the animation of a complex shaped object in the context of a complex background is a significant challenge.

Available technological approaches to providing real-time animation all have drawbacks. The creation and movement of images in wireframe representation lacks the realism of a shaded image. Flipbook animation techniques, whereby a series of images are created and stored in incremental motion states for subsequent playback at real-time rates, do not permit the user to interact with the moving image and affect it in a contemporaneous fashion.

Even in the absence of full, photorealistic color animation, it is particularly desirable to have a personal computer or workstation with resources which allow a user to interact with three-dimensional color images at rates approaching real time. This situation exists independent of classical animation, such as when a graphics workstation user repositions a complex color image in the context of a complex color background.

The conventional solution to creating and moving complex images situated over a complex background in real time and without regeneration involves the use of overlays. A classical overlay is a single color grid pattern, which if superimposed on a complex video screen image is removable without requiring that the complex image be regenerated. A discussion of overlays, and in particular overlays which relate to specific windows on a video display, appears in U.S. Pat. No. 5,469,541. A common deficiency of overlays, which makes them undesirable for animation, is the low number of bits per pixel. A representative premium quality workstation will have four overlays of single bit information per overlay. Consequently, such design provides one overlay image of 15 colors, while fully consuming all overlay resources, if the animation is accomplished through the overlays.

High resolution color graphics workstations tend to follow one of two design approaches in the storage of color data within the frame buffer. The first class is generally known as "color index frame buffer storage". The second is generally referred to as "gamma ramp frame buffer storage". The former, color index frame buffer storage, typically uses up to 12 bits per pixel to provide a maximum range of approximately four thousand different colors per pixel position. The other, gamma ramp frame buffer storage, has each pixel position represented by 24 bits, composed of 8 bit red, 8 bit green and 8 bit blue segments. The gamma ramp implementation provides in excess of 16 million different colors, and as such is believed to approach the limits of human visual color differentiation.

The problem of providing animation for complex shaped and colored images and backgrounds in real-time and in the context of a gamma ramp configured workstation has proven to be elusive. Neither the architectures of conventional overlays nor the look-up table implemented digital to analog converters (commonly identified as RAMDACs) have the overlay bit content or pin count resources to avail a conventional workstation user of meaningful animation capability.

SUMMARY OF THE INVENTION

The present invention defines methods, systems, and programs for using a gamma ramp frame buffer architecture workstation to render and manipulate at or near real time images composed of high resolution shaded color graphics in both foreground and background positions. The features are attained by selectively partitioning or subdividing the frame buffer so that each of the RGB color segments RGB are sub-divided into two or more parts, hereafter referred to as "partitions". During the writing of the frame buffer, the partitions not subject to writing are masked in conventional manner. The bit content written into each partition is scaled to match the allowable bit content and adjusted in offset depending on significance of the frame buffer address.

A preferable implementation utilizes dithering in the manner described in U.S. Pat. No. 4,956,638 to improve the color blend prior to rendering into those partitions which have a relatively low bit count. For instance, if an 8 bit emulation mode is utilized to generate the data for a 3-red, 3-green, and 3-blue partition of the frame buffer, dithering is a useful tool to eliminate color band distinctions in any shaded image. On the other hand, the remaining image, composed of 5-red, 5-green and 5-blue color segments, provides adequate color for rendering all but exceptionally unique and precise color images given that over 29 thousand colors are selectable from the 15 bits per pixel.

The partition of the frame buffer by color component, through the use of selective masking during the writing operation, is complemented during the conversion from binary digital frame buffer data to analog RBG signals by a selective programming of the color palette random access memory in the digital to analog converter (RAMDAC). This implementation provides two features. First, the physical connections between the gamma ramp configured frame buffer and each respective RAMDAC remain intact, in contrast to an arrangement in which additional overlays are created outside the context of the frame buffer. Secondly, an appropriate arrangement of the data in the color palette RAM ensures that the frame buffer defined color, whether it be in one or the other of the partitioned sections, is translated into the proper analog color signal. Foremost, all these are accomplished in such a way that both the foreground image, and the background image exist concurrently and completely in the frame buffer until specifically modified. Thus, the background image does not have to be regenerated upon the translation or other change of the foreground image and vice versa.

More generally, an image in one partition can be cleared, redrawn and manipulated without affecting the images in any of the other partitions. This is true without regard to the number of frame buffer partitions.

Furthermore, the "stacking order" of the partitions can be changed dynamically (i.e. very rapidly, without the need of regenerating any image) simply by loading a different color palette. By "stacking order" it is meant the order in which the images in the partitions appear visually. For example, in a two partition system, the foreground and the background can be interchanged, so that the previous background appears as the foreground, and vice versa, simply by computing and loading a different color palette. Similar remarks apply for systems divided into 3, 4, or more partitions.

The only limit on the number of partitions in a system is the total number of bit planes available. The sum total of the number of bit planes used in each partition must equal the number of hardware bit planes provided by the system.

Partitions can be any number of bits deep. The number of available colors in a partition is equal to $$\text{num colors}=(2^d-1)^3$$

where d=depth of partition, in bits.

Thus, a 1 bit partition provides 1 color, a 2 bit partition provides 27 colors, a 3 bit partion provides 343 colors, and so on.

These and other features of the invention will be more clearly understood and fully appreciated upon considering the detailed embodiments set forth here inafter.

BRIEF DESCRIPTION OF THE DRAWINGS

FIG. 4 compares the structure and effects for one pixel in a partitioned color index arrangement of the frame buffer.

FIG. 7 schematically depicts a multiple image partitioning of the bits in a gamma ramp frame buffer.

FIG. 14 defines the nomenclature used in FIGS. 8–13.

DESCRIPTION OF THE PREFERRED EMBODIMENT

Figure 1:
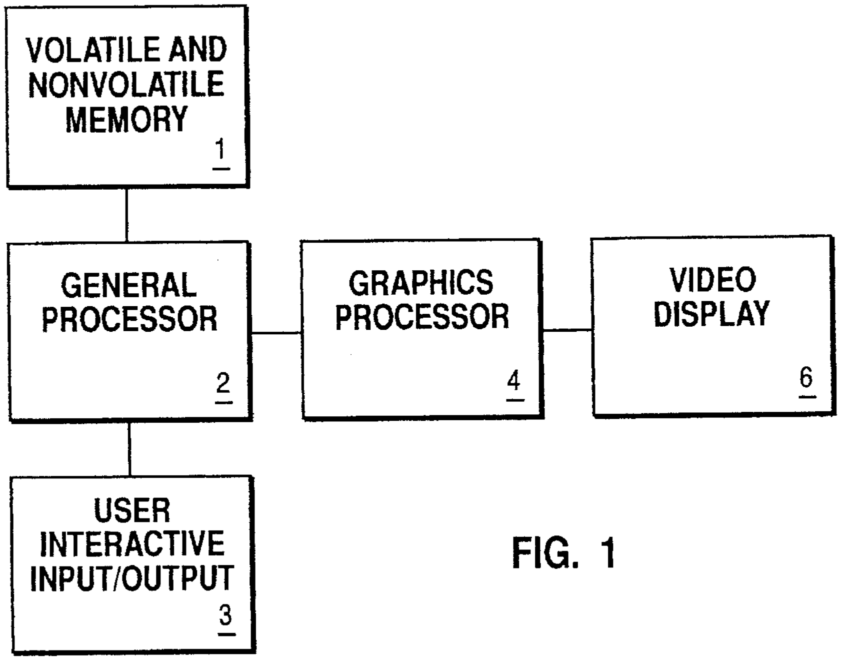
FIG. 1 is a schematic block diagram of the functional elements in a workstation.

FIG. 1 depicts by block diagram the basic functional elements in a personal computer or workstation to which the present invention relates. A representative product is the RISC System/6000 workstation with AIX operating systems software, both of which elements are commercially available products sold or licensed by International Business Machines Corporation. Such representative workstation includes various forms of memory 1, a general processor 2, a user interactive input/output 3, a graphics processor 4 and a video display 6. The present invention focuses on the graphic processor section, though data input from the general processor is needed as described hereinafter.

Figure 2:
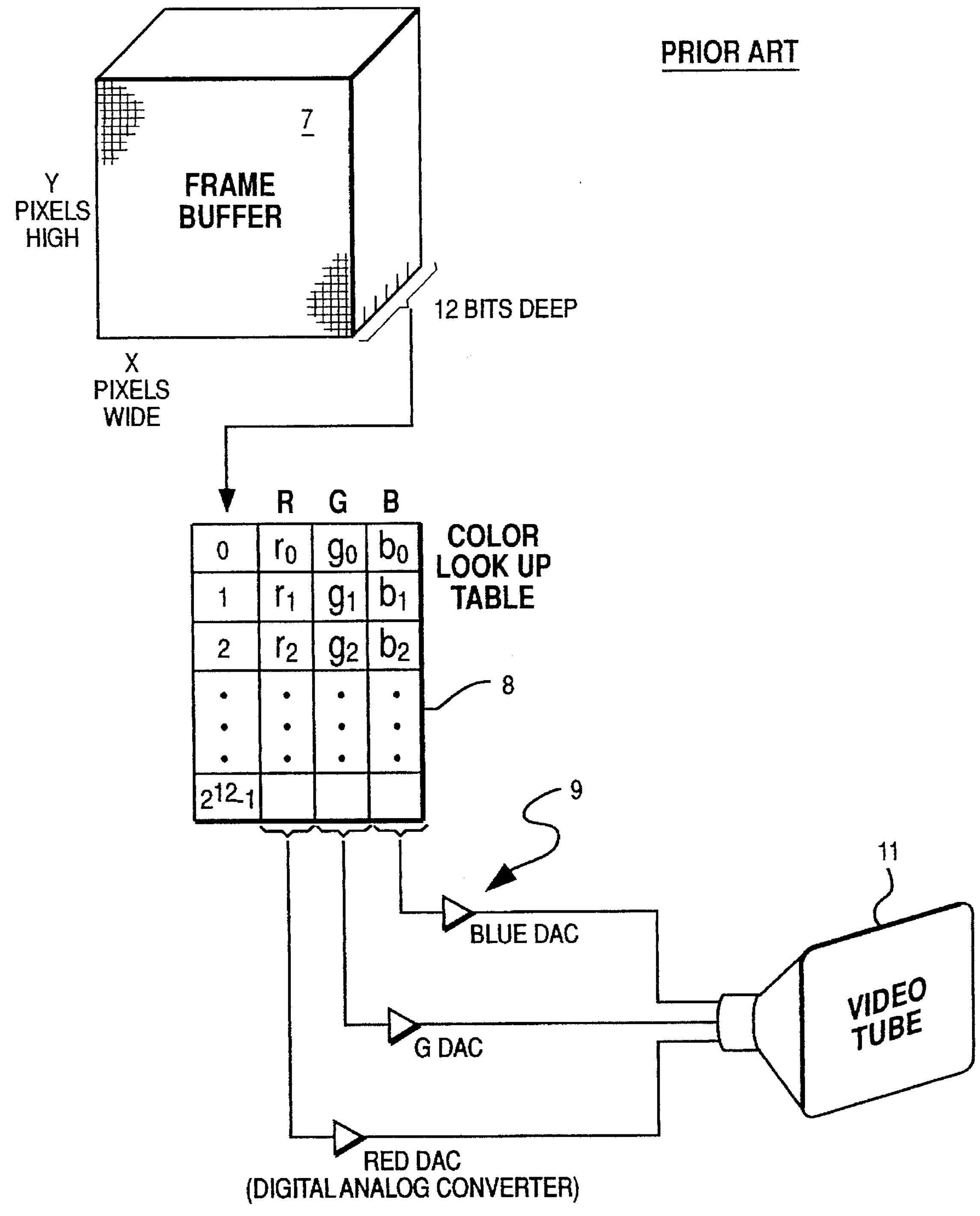
FIG. 2 is a schematic block diagram depicting the operation of a color index frame buffer.

A representative prior art graphic processor apparatus and method to convert binary digital data stored in the frame buffer into analog signals suitable to drive a video display is schematically depicted in FIG. 2. As shown there, a 12 bit deep frame buffer 7 stores a 12 bit word for each pixel position, the 12 bit word representing a single color of $2^{12}$=4096 available colors. The translation from the binary bits stored in the frame buffer to the individual red, green and blue color components of the video display is accomplished through color look-up table RAM 8. The resulting red, green and blue digital values for each 12 bit pixel are converted by digital to analog converters 9 and conveyed to drive video tube 11.

Figure 3:
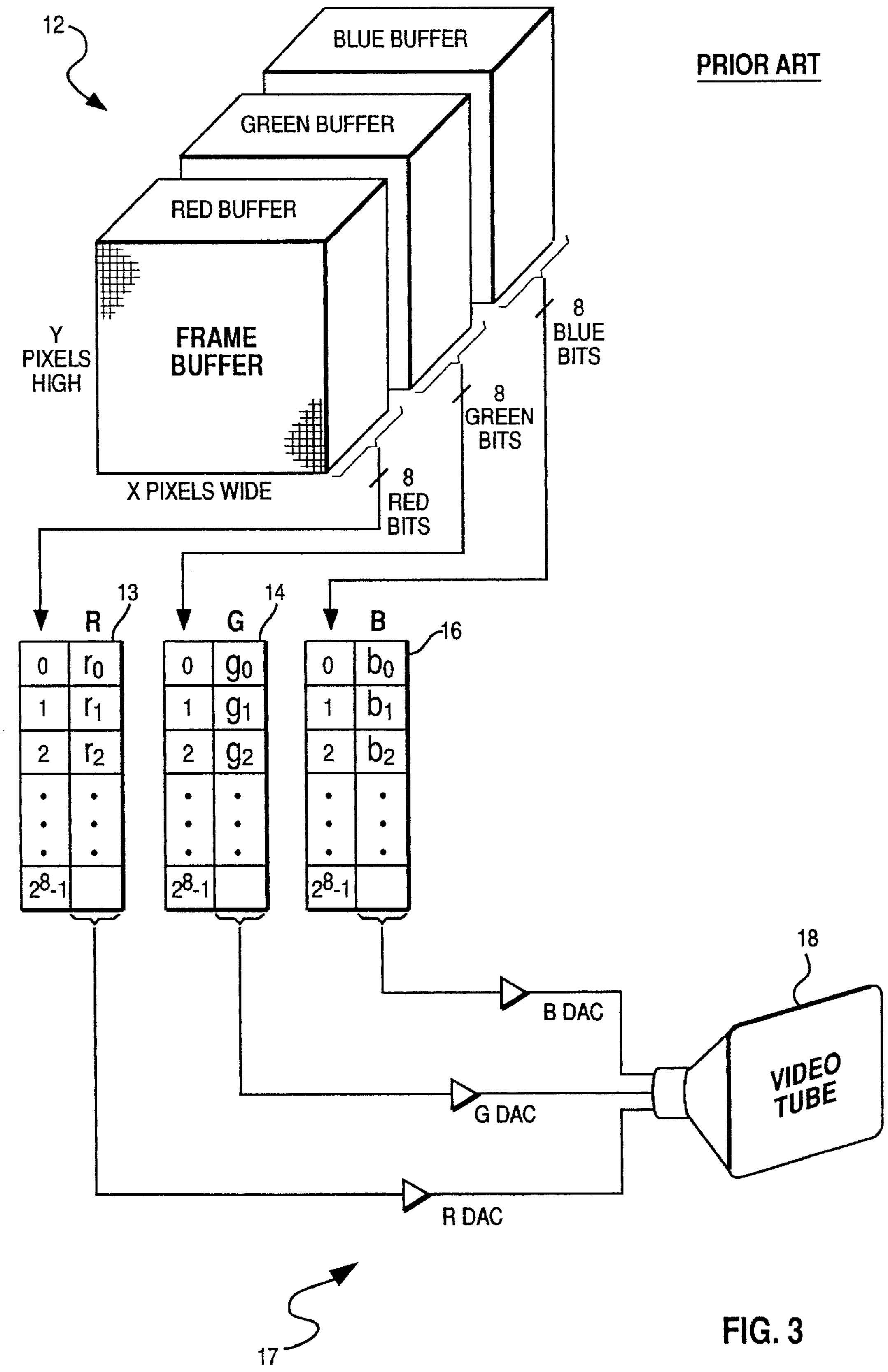
FIG. 3 is a schematic block diagram depicting the conventional operation of a gamma ramp frame buffer.

More recently workstations have begun to utilize gamma ramp frame buffer configurations, such as depicted in FIG. 3. With this architecture, the frame buffer 12 is physically divided into three regions which individually store the values of each color component as an 8 bit word. Thus, each pixel position is represented by a 24 bit combination of 8-red, 8-green and 8-blue components. According to this convention, each 8-bit color component is related to a distinct color look-up table, commonly known as a color palette RAM, as identified by reference numerals of 13, 14 and 16 in FIG. 3. Digital to analog conversion is accomplished in the three converters 17 before conveyance to video display 18.

Additional discussion about frame buffers, color look-up tables and digital to analog conversion for graphics workstations maybe found in U.S. Pat. No. 4,965,751. The use of shift registers to trade resolution for pixel bit depth is described in U.S. Pat. No. 4,783,652. The selective blanking of bit plane groups to accomplish priority and transparency is described in the IBM Technical Disclosure Bulletin, Vol. 32, No. 4A, September 1989, Pages 211–213.

Color index type frame buffers have been operated in a partitioned format, such as schematically depicted in FIG. 4, where each 12 bit string by pixel is sub-divided into separate groupings of bits. The color look-up table, as depicted in FIG. 2, is then loaded with a specific color for each possible combination of bits.

Although a color index type partition can be implemented on gamma ramp type frame buffer, it does not represent an optimal use of the available hardware. In particular, the number of color choices are more limited given that the number of available colors in a given color index style partition is far fewer than the number available through a gamma ramp frame buffer. In particular, a color index style partition on a representative contemporary 8-8-8 (8 bits red, 8 bits green, 8 bits blue) gamma ramp type frame buffer could not appropriately support shading, which typically requires that a large number of different but closely related colors be available, without a severe degradation of visual quality.

Figure 5:
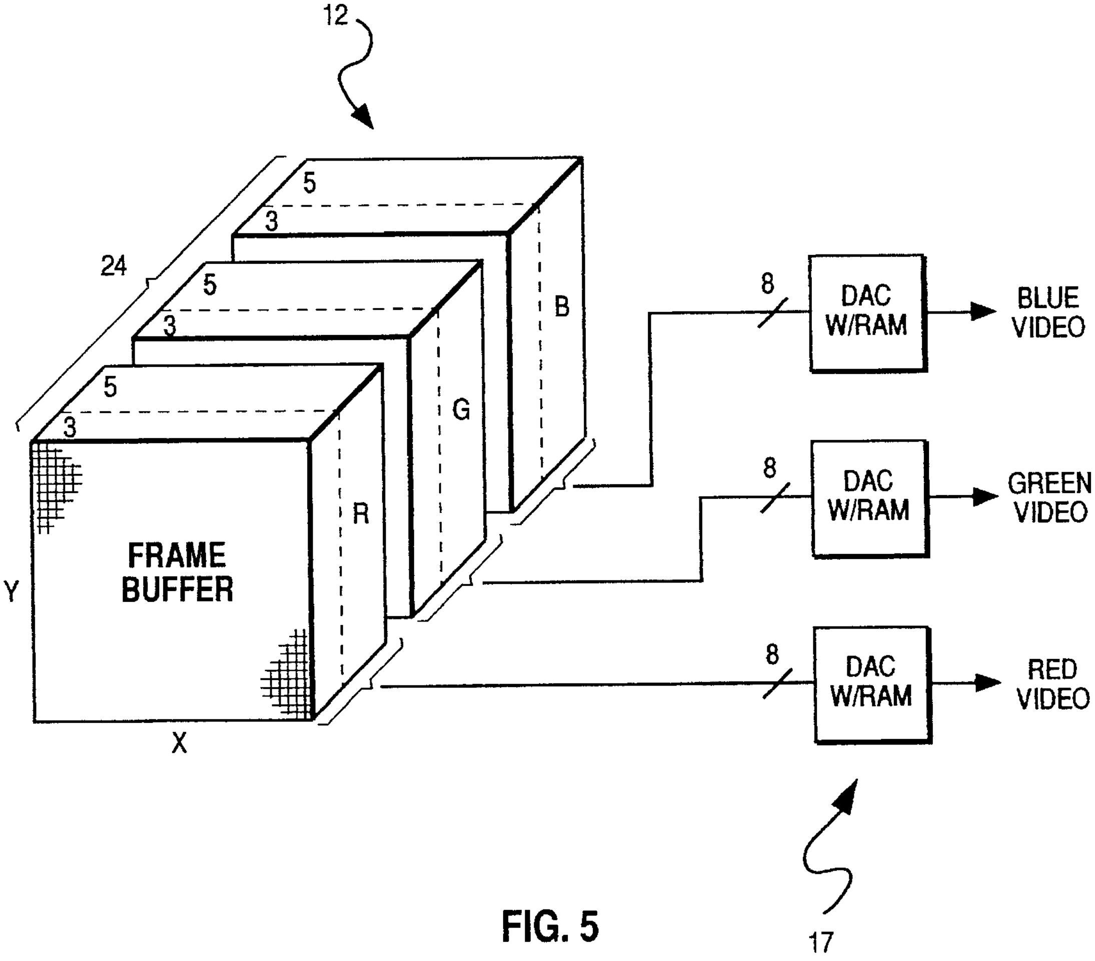
FIG. 5 schematic illustrates a partitioned gamma ramp frame buffer.

One implementation according to the practice of the present invention is schematically depicted in FIG. 5. Frame buffer 12 is partitioned so that each color component, red, green and blue, is divided to have a first grouping of 3 bit planes and a second grouping of 5 bit planes. Thus, the partitioned gamma ramp frame buffer depicted in FIG. 5 illustrates a configuration and use in which frame buffer 12 and RGB RAMDACs 13 do not require mechanical reconfiguration. The grouping of the planes in frame buffer 12 into matching sets provides a potential of 343 individual color shades for the 3-3-3 (RGB) grouping of 9 bit planes and up to 29,791 individual color shades for the 5-5-5 (RGB) grouping of 15 bit planes.

Though quality shaded color rendering is feasible using the 5 bit partitions, it remains somewhat marginal for the 3 bit partitions. To improve the quality of the shading in the 3 bit groupings of the partitions, the invention contemplates the practice of dithering as described in the U.S. Pat. No. 4,956,638. The dithering is accomplished before writing the image date into the frame buffer.

The methods, systems and programs relating to the architecture in FIG. 5 provide adequate color range and granularity to ensure a realistic rendering of 3-dimensional shaded images. This is accomplished by judiciously partitioning the frame buffer and, where necessary, applying dithered smoothing effects.

The invention is particularly useful and valuable because it provides such features within the framework of a relatively conventional workstation architecture, namely one utilizing a 24 bit gamma ramp style frame buffer and RAMDACs having conventional color palette, window, overlay, mask and cursor control. An example of such suitable architecture is depicted by block diagram in FIG. 6.

A partitioning of frame buffer 12 into groups of bit planes, as schematically depicted in FIG. 5, requires that the associated RAMDAC color palettes have appropriately matching data sets. The data for the color palette RAMs in the video RAMDACs is loaded directly from processor 21 during configuration. Example data will be sent forth by table hereinafter. The fundamental concept for defining the content of the color palette is to ensure for every possible color address contained in the frame buffer representing an underlying image there exists an address corresponding to every possible color in the buffer for the overlying image.

Note that the palette can be arranged such that either the one, or the other partition can be made to be the overlying image. The question of which image appears to be the visually overlying image is determined solely by the format of the data stored in the color palette. This property is not changed if the number of partitions is increased. If, for instance, the frame buffer is partioned into three groups, any one of the groups can be made the foreground, any one of the remaning the middleground, and the last the background. In all cases, the order is determined solely by the format of the data contained in the color palette.

Figure 6:
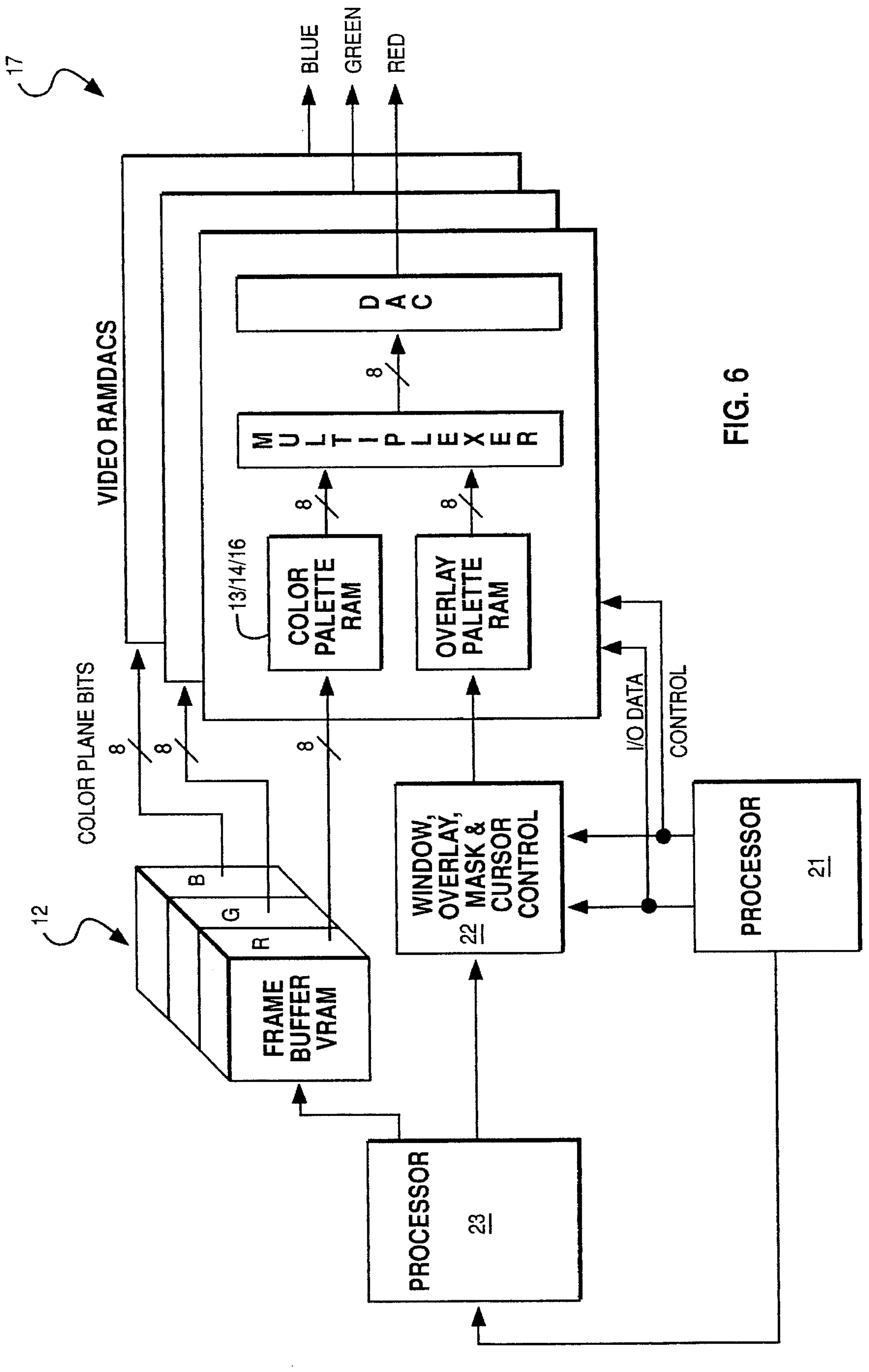
FIG. 6 schematically illustrates by block diagram the arrangement of a gamma ramp frame buffer in relation to video RAMDACs with overlay controls.

The general architecture of the graphics processor system as depicted in FIG. 6 is relatively representative of contemporary gamma ramp frame buffer workstation designs. A video RAMDAC which can provide the color palette RAM resources suitable to load the appropriate color look-up table is manufactured by Brooktree, and is commercially available under the part number Bt462. Though the generic representation of the frame buffer in FIG. 6 shows only one bank of memory, a preferred and commonly practiced implementation utilizes double buffering. Double buffering is a technique by which a stable image is depicted on the video display using the contents of one frame buffer while the second frame buffer is revised. At appropriate time intervals the functions of the two frame buffers are reversed.

With reference to FIG. 6, a general practice of the invention involves the execution of an application program in processors 21 and 23 to control the graphics system. During configuration, processor 21 loads the color palette RAMs 13/14/16 of the RAMDACs 17 consistent with the anticipated partitioning of gamma ramp configured frame buffer 18. Control of the windows, overlays, masks and cursor proceeds in normal manner using the related bit planes and control signals from control 22 to manipulate the action of the corresponding functions in RAMDACs 17. Processor 23, in response to general processor 21 commands, selectively invokes various operating modes to selectively generate images with appropriate partitions of the planes in frame buffer 12. Representative modes of operation include 8 bit emulation and masked writing of selective bit planes. Another function performed by processor 23, in response to enabling control signals from processor 21 is scaling and offset calculation. The offsets relate data and bit significance within the frame buffering memory address space, and avoid inappropriate color blending during dithered operation. Each of these will be considered in turnout hereinafter.

Consider an operating example as follows. The objective is to partition a gamma ramp frame buffer so that a 3-dimensional fully shaded foreground image is capable of being rendered for real-time animation in the context of a complex color background image. The complexity of the background image is presumed to be great enough to prevent real-time animation if reconstruction of the background is ever mandated as a consequence of the movement of the foreground image. As a first step, processor 21 and 23 are placed in a 24 bit color mode of operation, as is typical with gamma ramp frame buffers. Next, the upper 3 bit planes of each 8 bit plane color component set within the frame buffer are masked off while the background (inanimate) image is rendered. Scaling of the values to be entered into the 5-5-5 RGB bit planes is accomplished by first normalizing each color component value, that is establishing a range for each RGB component between the value 0.0 and 1.0, and then multiplying each color component by 31. The integer value for each color component is then written into the 5 bit planes associated with the color component. The decimal value 31 is derived from the number of potential values that can be represented with a 5 place binary number, less one for transparency. Each color component is treated identically.

Once the background image is fully rendered into the 5-5-5 partitions of the frame buffer, the remaining 3-3-3 bit planes of the frame buffer are subject to being rendered with the data representing the foreground or animate image. This is accomplished by masking the lower 5 bit planes for each color component and then proceeding in a manner analogous to that previously undertaken for the 5-5-5 partition.

Because of the limited color diversity available from a 3-3-3 RGB arrangement, a preferred practiced involves the use of dithering as described in U.S. Pat. No. 4,956,638. The dithering improves the shading by providing a visually perceived blend of the color boundaries when viewed at a normal distance from the video display screen. A particularly effective implementation of dithering involves the use of the POWER Gt4 or Gt4x graphics adapters in the aforemention IBM brand RISC System/6000 workstation. When dithering is enabled, input 8-8-8 RGB values are passed through the dithering mechanism and written as 3-3-2 RGB values into the frame buffer. The system is arranged such that the dithered pixel values are written into the 3-3-3 most significant bit-planes of the frame buffer. The lower 5 bit planes of each 8 bit color component of the frame buffer are masked during the writing of the dithered emulation results.

Before incoming RGB data destined for the 3-3-3 patition is written in to the frame buffer, it is manipulated in a number of ways. First, the data is normalized by color component to values between 0.0 and 1.0. Then it's multiplied by 7 or 3, respectively for the color components having the 3 and the 2 bit planes. The value 7 is derived from (2x2x2)−1, the loss being for transparency. Only integer results of the multiplication are used. Since the integer values are destined to be written into the three most significant bit planes of in each color component, the values are then offset by a factor of 32. A final adjustment to establish the actual value entered into the frame buffer occurs as a consequence of the dithering. An adjustment in the number of shades per color component for the 3-3-3 distribution reduces the maximum of 8 red, 8 green, and 4 blue to 7 red, 7 green, 3 blue. The discarded shades are set to a value of zero to avoid addressing of incorrect locations in the color palette.

Table A sets forth the preferred contents of the color palette for the 5-5-5 and 3-3-2 embodiment of a partitioned frame buffer. The data is set forth in hexadecimal with the RGB input addresses at the left and the associated index colors at the right. As noted earlier, the palette data is suited for the earlier identified Brooktree devices.

TABLE A

TWO BUFFER UNDERLAY PALETTE

| | R | G | B | | INDEX |
|---|---|---|---|---|---|
| 0x | 00 | 00 | 00 | # | 0 0x00 |
| 0x | 08 | 08 | 08 | # | 1 0x01 |
| 0x | 10 | 10 | 10 | # | 2 0x02 |
| 0x | 18 | 18 | 18 | # | 3 0x03 |
| 0x | 20 | 20 | 20 | # | 4 0x04 |
| 0x | 29 | 29 | 29 | # | 5 0x05 |
| 0x | 31 | 31 | 31 | # | 6 0x06 |
| 0x | 39 | 39 | 39 | # | 7 0x07 |
| 0x | 41 | 41 | 41 | # | 8 0x08 |
| 0x | 4a | 4a | 4a | # | 9 0x09 |
| 0x | 52 | 52 | 52 | # | 10 0x0a |
| 0x | 5a | 5a | 5a | # | 11 0x0b |
| 0x | 62 | 62 | 62 | # | 12 0x0a |
| 0x | 6a | 6a | 6a | # | 13 0x0d |
| 0x | 73 | 73 | 73 | # | 14 0x0e |
| 0x | 7b | 7b | 7b | # | 15 0x0f |
| 0x | 83 | 83 | 83 | # | 16 0x10 |
| 0x | 8b | 8b | 8b | # | 17 0x11 |
| 0x | 94 | 94 | 94 | # | 18 0x12 |
| 0x | 9c | 9c | 9c | # | 19 0x13 |
| 0x | a4 | a4 | a4 | # | 20 0x14 |
| 0x | ac | ac | ac | # | 21 0x15 |
| 0x | b4 | b4 | b4 | # | 22 0x16 |
| 0x | bd | bd | bd | # | 23 0x17 |
| 0x | c5 | c5 | c5 | # | 24 0x18 |
| 0x | cd | cd | cd | # | 25 0x19 |
| 0x | d5 | d5 | d5 | # | 26 0x1a |
| 0x | de | de | de | # | 27 0x1b |
| 0x | e6 | e6 | e6 | # | 28 0x1c |
| 0x | ee | ee | ee | # | 29 0x1d |
| 0x | f6 | f6 | f6 | # | 30 0x1e |
| 0x | fe | fe | fe | # | 31 0x1f |
| 0x | 24 | 24 | 55 | # | 32 0x20 |
| 0x | 24 | 24 | 55 | # | 33 0x21 |
| 0x | 24 | 24 | 55 | # | 34 0x22 |
| 0x | 24 | 24 | 55 | # | 35 0x23 |
| 0x | 24 | 24 | 55 | # | 36 0x24 |
| 0x | 24 | 24 | 55 | # | 37 0x25 |
| 0x | 24 | 24 | 55 | # | 38 0x26 |
| 0x | 24 | 24 | 55 | # | 39 0x27 |
| 0x | 24 | 24 | 55 | # | 40 0x28 |
| 0x | 24 | 24 | 55 | # | 41 0x29 |
| 0x | 24 | 24 | 55 | # | 42 0x2a |
| 0x | 24 | 24 | 55 | # | 43 0x2b |
| 0x | 24 | 24 | 55 | # | 44 0x2c |
| 0x | 24 | 24 | 55 | # | 45 0x2d |

TABLE A-continued

TWO BUFFER UNDERLAY PALETTE

| | R | G | B | | INDEX |
|---|---|---|---|---|---|
| 0x | 24 | 24 | 55 | # | 46 0x2e |
| 0x | 24 | 24 | 55 | # | 47 0x2f |
| 0x | 24 | 24 | 55 | # | 48 0x30 |
| 0x | 24 | 24 | 55 | # | 49 0x31 |
| 0x | 24 | 24 | 55 | # | 50 0x32 |
| 0x | 24 | 24 | 55 | # | 51 0x33 |
| 0x | 24 | 24 | 55 | # | 52 0x34 |
| 0x | 24 | 24 | 55 | # | 53 0x35 |
| 0x | 24 | 24 | 55 | # | 54 0x36 |
| 0x | 24 | 24 | 55 | # | 55 0x37 |
| 0x | 24 | 24 | 55 | # | 56 0x38 |
| 0x | 24 | 24 | 55 | # | 57 0x39 |
| 0x | 24 | 24 | 55 | # | 58 0x3a |
| 0x | 24 | 24 | 55 | # | 59 0x3b |
| 0x | 24 | 24 | 55 | # | 60 0x3c |
| 0x | 24 | 24 | 55 | # | 61 0x3d |
| 0x | 24 | 24 | 55 | # | 62 0x3e |
| 0x | 24 | 24 | 55 | # | 63 0x3f |
| 0x | 48 | 48 | aa | # | 64 0x40 |
| 0x | 48 | 48 | aa | # | 65 0x41 |
| 0x | 48 | 48 | aa | # | 66 0x42 |
| 0x | 48 | 48 | aa | # | 67 0x43 |
| 0x | 48 | 48 | aa | # | 68 0x44 |
| 0x | 48 | 48 | aa | # | 69 0x45 |
| 0x | 48 | 48 | aa | # | 70 0x46 |
| 0x | 48 | 48 | aa | # | 71 0x47 |
| 0x | 48 | 48 | aa | # | 72 0x48 |
| 0x | 48 | 48 | aa | # | 73 0x49 |
| 0x | 48 | 48 | aa | # | 74 0x4a |
| 0x | 48 | 48 | aa | # | 75 0x4b |
| 0x | 48 | 48 | aa | # | 76 0x4c |
| 0x | 48 | 48 | aa | # | 77 0x4d |
| 0x | 48 | 48 | aa | # | 78 0x4e |
| 0x | 48 | 48 | aa | # | 79 0x4f |
| 0x | 48 | 48 | aa | # | 80 0x50 |
| 0x | 48 | 48 | aa | # | 81 0x51 |
| 0x | 48 | 48 | aa | # | 82 0x52 |
| 0x | 48 | 48 | aa | # | 83 0x53 |
| 0x | 48 | 48 | aa | # | 84 0x54 |
| 0x | 48 | 48 | aa | # | 85 0x55 |
| 0x | 48 | 48 | aa | # | 86 0x56 |
| 0x | 48 | 48 | aa | # | 87 0x57 |
| 0x | 48 | 48 | aa | # | 88 0x58 |
| 0x | 48 | 48 | aa | # | 89 0x59 |
| 0x | 48 | 48 | aa | # | 90 0x5a |
| 0x | 48 | 48 | aa | # | 91 0x5b |
| 0x | 48 | 48 | aa | # | 92 0x5c |
| 0x | 48 | 48 | aa | # | 93 0x5d |
| 0x | 48 | 48 | aa | # | 94 0x5e |
| 0x | 48 | 48 | aa | # | 95 0x5f |
| 0x | 6d | 6d | ff | # | 96 0x60 |
| 0x | 6d | 6d | ff | # | 97 0x61 |
| 0x | 6d | 6d | ff | # | 98 0x62 |
| 0x | 6d | 6d | ff | # | 99 0x63 |
| 0x | 6d | 6d | ff | # | 100 0x64 |
| 0x | 6d | 6d | ff | # | 101 0x65 |
| 0x | 6d | 6d | ff | # | 102 0x66 |
| 0x | 6d | 6d | ff | # | 103 0x67 |
| 0x | 6d | 6d | ff | # | 104 0x68 |
| 0x | 6d | 6d | ff | # | 105 0x69 |
| 0x | 6d | 6d | ff | # | 106 0x6a |
| 0x | 6d | 6d | ff | # | 107 0x6b |
| 0x | 6d | 6d | ff | # | 108 0x6c |
| 0x | 6d | 6d | ff | # | 109 0x6d |
| 0x | 6d | 6d | ff | # | 110 0x6e |
| 0x | 6d | 6d | ff | # | 111 0x6f |
| 0x | 6d | 6d | ff | # | 112 0x70 |
| 0x | 6d | 6d | ff | # | 113 0x71 |
| 0x | 6d | 6d | ff | # | 114 0x72 |
| 0x | 6d | 6d | ff | # | 115 0x73 |
| 0x | 6d | 6d | ff | # | 116 0x74 |
| 0x | 6d | 6d | ff | # | 117 0x75 |
| 0x | 6d | 6d | ff | # | 118 0x76 |
| 0x | 6d | 6d | ff | # | 119 0x77 |

TABLE A-continued

TWO BUFFER UNDERLAY PALETTE

| | R | G | B | | INDEX |
|---|---|---|---|---|---|
| 0x | 6d | 6d | ff | # | 120 0x78 |
| 0x | 6d | 6d | ff | # | 121 0x79 |
| 0x | 6d | 6d | ff | # | 122 0x7a |
| 0x | 6d | 6d | ff | # | 123 0x7b |
| 0x | 6d | 6d | ff | # | 124 0x7c |
| 0x | 6d | 6d | ff | # | 125 0x7d |
| 0x | 6d | 6d | ff | # | 126 0x7e |
| 0x | 6d | 6d | ff | # | 127 0x7f |
| 0x | 91 | 91 | 00 | # | 128 0x80 |
| 0x | 91 | 91 | 00 | # | 129 0x81 |
| 0x | 91 | 91 | 00 | # | 130 0x82 |
| 0x | 91 | 91 | 00 | # | 131 0x83 |
| 0x | 91 | 91 | 00 | # | 132 0x84 |
| 0x | 91 | 91 | 00 | # | 133 0x85 |
| 0x | 91 | 91 | 00 | # | 134 0x86 |
| 0x | 91 | 91 | 00 | # | 135 0x87 |
| 0x | 91 | 91 | 00 | # | 136 0x88 |
| 0x | 91 | 91 | 00 | # | 137 0x89 |
| 0x | 91 | 91 | 00 | # | 138 0x8a |
| 0x | 91 | 91 | 00 | # | 139 0x8b |
| 0x | 91 | 91 | 00 | # | 140 0x8c |
| 0x | 91 | 91 | 00 | # | 141 0x9d |
| 0x | 91 | 91 | 00 | # | 142 0x8e |
| 0x | 91 | 91 | 00 | # | 143 0x8f |
| 0x | 91 | 91 | 00 | # | 144 0x90 |
| 0x | 91 | 91 | 00 | # | 145 0x91 |
| 0x | 91 | 91 | 00 | # | 146 0x92 |
| 0x | 91 | 91 | 00 | # | 147 0x93 |
| 0x | 91 | 91 | 00 | # | 148 0x94 |
| 0x | 91 | 91 | 00 | # | 149 0x95 |
| 0x | 91 | 91 | 00 | # | 150 0x96 |
| 0x | 91 | 91 | 00 | # | 151 0x97 |
| 0x | 91 | 91 | 00 | # | 152 0x98 |
| 0x | 91 | 91 | 00 | # | 153 0x99 |
| 0x | 91 | 91 | 00 | # | 154 0x9a |
| 0x | 91 | 91 | 00 | # | 155 0x9b |
| 0x | 91 | 91 | 00 | # | 156 0x9c |
| 0x | 91 | 91 | 00 | # | 157 0x9d |
| 0x | 91 | 91 | 00 | # | 158 0x9e |
| 0x | 91 | 91 | 00 | # | 159 0x9f |
| 0x | b6 | b6 | 55 | # | 160 0xa0 |
| 0x | b6 | b6 | 55 | # | 161 0xa1 |
| 0x | b6 | b6 | 55 | # | 162 0xa2 |
| 0x | b6 | b6 | 55 | # | 163 0xa3 |
| 0x | b6 | b6 | 55 | # | 164 0xa4 |
| 0x | b6 | b6 | 55 | # | 165 0xa5 |
| 0x | b6 | b6 | 55 | # | 166 0xa6 |
| 0x | b6 | b6 | 55 | # | 167 0xa7 |
| 0x | b6 | b6 | 55 | # | 168 0xa8 |
| 0x | b6 | b6 | 55 | # | 169 0xa9 |
| 0x | b6 | b6 | 55 | # | 170 0xaa |
| 0x | b6 | b6 | 55 | # | 171 0xab |
| 0x | b6 | b6 | 55 | # | 172 0xac |
| 0x | b6 | b6 | 55 | # | 173 0xad |
| 0x | b6 | b6 | 55 | # | 174 0xae |
| 0x | b6 | b6 | 55 | # | 175 0xaf |
| 0x | b6 | b6 | 55 | # | 176 0xb0 |
| 0x | b6 | b6 | 55 | # | 177 0xb1 |
| 0x | b6 | b6 | 55 | # | 178 0xb2 |
| 0x | b6 | b6 | 55 | # | 179 0xb3 |
| 0x | b6 | b6 | 55 | # | 180 0xb4 |
| 0x | b6 | b6 | 55 | # | 181 0xb5 |
| 0x | b6 | b6 | 55 | # | 182 0xb6 |
| 0x | b6 | b6 | 55 | # | 183 0xb7 |
| 0x | b6 | b6 | 55 | # | 184 0xb8 |
| 0x | b6 | b6 | 55 | # | 185 0xb9 |
| 0x | b6 | b6 | 55 | # | 186 0xba |
| 0x | b6 | b6 | 55 | # | 187 0xbb |
| 0x | b6 | b6 | 55 | # | 188 0xbc |
| 0x | b6 | b6 | 55 | # | 189 0xbd |
| 0x | b6 | b6 | 55 | # | 190 0xbe |
| 0x | b6 | b6 | 55 | # | 191 0xbf |
| 0x | da | da | aa | # | 192 0xc0 |
| 0x | da | da | aa | # | 193 0xc1 |
| 0x | da | da | aa | # | 194 0xc2 |

TABLE A-continued

TWO BUFFER UNDERLAY PALETTE

| | R | G | B | | INDEX |
|---|---|---|---|---|---|
| 0x | da | da | aa | # | 195 0xc3 |
| 0x | da | da | aa | # | 196 0xc4 |
| 0x | da | da | aa | # | 197 0xc5 |
| 0x | da | da | aa | # | 198 0xc6 |
| 0x | da | da | aa | # | 199 0xc7 |
| 0x | da | da | aa | # | 200 0xc8 |
| 0x | da | da | aa | # | 201 0xc9 |
| 0x | da | da | aa | # | 202 0xca |
| 0x | da | da | aa | # | 203 0xcb |
| 0x | da | da | aa | # | 204 0xcc |
| 0x | da | da | aa | # | 205 0xcd |
| 0x | da | da | aa | # | 206 0xce |
| 0x | da | da | aa | # | 207 0xcf |
| 0x | da | da | aa | # | 208 0xd0 |
| 0x | da | da | aa | # | 209 0xd1 |
| 0x | da | da | aa | # | 210 0xd2 |
| 0x | da | da | aa | # | 211 0xd3 |
| 0x | da | da | aa | # | 212 0xd4 |
| 0x | da | da | aa | # | 213 0xd5 |
| 0x | da | da | aa | # | 214 0xd6 |
| 0x | da | da | aa | # | 215 0xd7 |
| 0x | da | da | aa | # | 216 0xd8 |
| 0x | da | da | aa | # | 217 0xd9 |
| 0x | da | da | aa | # | 218 0xda |
| 0x | da | da | aa | # | 219 0xdb |
| 0x | da | da | aa | # | 220 0xdc |
| 0x | da | da | aa | # | 221 0xdd |
| 0x | da | da | aa | # | 222 0xde |
| 0x | da | da | aa | # | 223 0xdf |
| 0x | ff | ff | ff | # | 224 0xe0 |
| 0x | ff | ff | ff | # | 225 0xe1 |
| 0x | ff | ff | ff | # | 226 0xe2 |
| 0x | ff | ff | ff | # | 227 0xe3 |
| 0x | ff | ff | ff | # | 228 0xe4 |
| 0x | ff | ff | ff | # | 229 0xe5 |
| 0x | ff | ff | ff | # | 230 0xe6 |
| 0x | ff | ff | ff | # | 231 0xe7 |
| 0x | ff | ff | ff | # | 232 0xe8 |
| 0x | ff | ff | ff | # | 233 0xe9 |
| 0x | ff | ff | ff | # | 234 0xea |
| 0x | ff | ff | ff | # | 235 0xeb |
| 0x | ff | ff | ff | # | 236 0xec |
| 0x | ff | ff | ff | # | 237 0xed |
| 0x | ff | ff | ff | # | 238 0xee |
| 0x | ff | ff | ff | # | 239 0xef |
| 0x | ff | ff | ff | # | 240 0xf0 |
| 0x | ff | ff | ff | # | 241 0xf1 |
| 0x | ff | ff | ff | # | 242 0xf2 |
| 0x | ff | ff | ff | # | 243 0xf3 |
| 0x | ff | ff | ff | # | 244 0xf4 |
| 0x | ff | ff | ff | # | 245 0xf5 |
| 0x | ff | ff | ff | # | 246 0xf6 |
| 0x | ff | ff | ff | # | 247 0xf7 |
| 0x | ff | ff | ff | # | 248 0xf8 |
| 0x | ff | ff | ff | # | 249 0xf9 |
| 0x | ff | ff | ff | # | 250 0xfa |
| 0x | ff | ff | ff | # | 251 0xfb |
| 0x | ff | ff | ff | # | 252 0xfc |
| 0x | ff | ff | ff | # | 253 0xfd |
| 0x | ff | ff | ff | # | 254 0xfe |
| 0x | ff | ff | ff | # | 255 0xff |

FIG. 7 illustrates that the partitioning of a gamma ramp frame buffer is not restricted to a 5-5-5 and 3-3-5 arrangement, but can follow a variety of subdivisions dictated to a substantial extent by the number of the colors needed by each object. The frame buffer in FIG. 7 is divided into four partitions, A, B, C and D, respectively having 27 colors, 1 color, 343 colors and 27 colors.

Table B sets forth the color palette RAM data for another representative partition, in which the gamma ramp frame buffer is three independent images, a 2-2-2 color background, a 3-3-2 color dithered middle image and a 3-3-2 dithered top or foreground image. Animation using the three partition frame buffer has proven to have acceptable color quality while providing real-time motion and user responsiveness.

THREE BUFFS PALETTE

| | R | G | B | | INDEX |
|---|---|---|---|---|---|
| 0X | 00 | 00 | 00 | # | 0 0x00 |
| 0x | 55 | 55 | 55 | # | 1 0x01 |
| 0x | aa | aa | aa | # | 2 0x02 |
| 0x | ff | ff | ff | # | 3 0x03 |
| 0x | 24 | 24 | 55 | # | 4 0x04 |
| 0x | 24 | 24 | 55 | # | 5 0x05 |
| 0x | 24 | 24 | aa | # | 6 0x06 |
| 0x | 24 | 24 | ff | # | 7 0x07 |
| 0x | 48 | 48 | aa | # | 8 0x08 |
| 0x | 48 | 48 | 55 | # | 9 0x09 |
| 0x | 48 | 48 | aa | # | 10 0x0a |
| 0x | 48 | 48 | ff | # | 11 0x0b |
| 0x | 6d | 6d | ff | # | 12 0x0c |
| 0x | 6d | 6d | 55 | # | 13 0x0d |
| 0x | 6d | 6d | aa | # | 14 0x0e |
| 0x | 6d | 6d | ff | # | 15 0x0f |
| 0x | 91 | 91 | 55 | # | 16 0x10 |
| 0x | 91 | 91 | 55 | # | 17 0x11 |
| 0x | 91 | 91 | aa | # | 18 0x12 |
| 0x | 91 | 91 | ff | # | 19 0x13 |
| 0x | b6 | b6 | 55 | # | 20 0x14 |
| 0x | b6 | b6 | 55 | # | 21 0x15 |
| 0x | b6 | b6 | aa | # | 22 0x16 |
| 0x | b6 | b6 | ff | # | 23 0x17 |
| 0x | da | da | 55 | # | 24 0x18 |
| 0x | da | da | 55 | # | 25 0x19 |
| 0x | da | da | aa | # | 26 0x1a |
| 0x | da | da | ff | # | 27 0x1b |
| 0x | ff | ff | 55 | # | 28 0x1c |
| 0x | ff | ff | 55 | # | 29 0x1d |
| 0x | ff | ff | aa | # | 30 0x1e |
| 0x | ff | ff | ff | # | 31 0x1f |
| 0x | 24 | 24 | aa | # | 32 0x20 |
| 0x | 24 | 24 | 55 | # | 33 0x21 |
| 0x | 24 | 24 | aa | # | 34 0x22 |
| 0x | 24 | 24 | ff | # | 35 0x23 |
| 0x | 24 | 24 | aa | # | 36 0x24 |
| 0x | 24 | 24 | 55 | # | 37 0x25 |
| 0x | 24 | 24 | aa | # | 38 0x26 |
| 0x | 24 | 24 | ff | # | 39 0x27 |
| 0x | 24 | 48 | aa | # | 40 0x28 |
| 0x | 24 | 48 | 55 | # | 41 0x29 |
| 0x | 24 | 48 | aa | # | 42 0x2a |
| 0x | 24 | 48 | ff | # | 43 0x2b |
| 0x | 24 | 6d | aa | # | 44 0x2c |
| 0x | 24 | 6d | 55 | # | 45 0x2d |
| 0x | 24 | 6d | aa | # | 46 0x2e |
| 0x | 24 | 6d | ff | # | 47 0x2f |
| 0x | 24 | 91 | ff | # | 48 0x30 |
| 0x | 24 | 91 | 55 | # | 49 0x31 |
| 0x | 24 | 91 | aa | # | 50 0x32 |
| 0x | 24 | 91 | ff | # | 51 0x33 |
| 0x | 24 | b6 | ff | # | 52 0x34 |
| 0x | 24 | b6 | 55 | # | 53 0x35 |
| 0x | 24 | b6 | aa | # | 54 0x36 |
| 0x | 24 | b6 | ff | # | 55 0x37 |
| 0x | 24 | da | ff | # | 56 0x38 |
| 0x | 24 | da | 55 | # | 57 0x39 |
| 0x | 24 | da | aa | # | 58 0x3a |
| 0x | 24 | da | ff | # | 59 0x3b |
| 0x | 24 | ff | ff | # | 60 0x3c |
| 0x | 24 | ff | 55 | # | 61 0x3d |
| 0x | 24 | ff | aa | # | 62 0x3e |
| 0x | 24 | ff | ff | # | 63 0x3f |
| 0x | 48 | 48 | 00 | # | 64 0x40 |
| 0x | 48 | 48 | 00 | # | 65 0x41 |
| 0x | 48 | 48 | 00 | # | 66 0x42 |
| 0x | 48 | 48 | 00 | # | 67 0x43 |
| 0x | 48 | 24 | 00 | # | 68 0X44 |
| 0x | 48 | 24 | 00 | # | 69 0x45 |

-continued

THREE BUFFS PALETTE

| | R | G | B | | INDEX |
|---|---|---|---|---|---|
| 0x | 48 | 24 | 00 | # | 70 0x46 |
| 0x | 48 | 24 | 00 | # | 71 0x47 |
| 0x | 48 | 48 | 00 | # | 72 0x48 |
| 0x | 48 | 48 | 00 | # | 73 0x49 |
| 0x | 48 | 48 | 00 | # | 74 0x4a |
| 0x | 48 | 48 | 00 | # | 75 0x4b |
| 0x | 48 | 6d | 00 | # | 76 0x4c |
| 0x | 48 | 6d | 00 | # | 77 0x4d |
| 0x | 48 | 6d | 00 | # | 78 0x4e |
| 0x | 48 | 6d | 00 | # | 79 0x4f |
| 0x | 48 | 91 | 00 | # | 80 0x50 |
| 0x | 48 | 91 | 00 | # | 81 0x51 |
| 0x | 48 | 91 | 00 | # | 82 0x52 |
| 0x | 48 | 91 | 00 | # | 83 0x53 |
| 0x | 48 | b6 | 00 | # | 84 0x54 |
| 0x | 48 | b6 | 00 | # | 85 0x55 |
| 0x | 48 | b6 | 00 | # | 86 0x56 |
| 0x | 48 | b6 | 00 | # | 87 0x57 |
| 0x | 48 | da | 00 | # | 88 0x58 |
| 0x | 48 | da | 00 | # | 89 0x59 |
| 0x | 48 | da | 00 | # | 90 0x5a |
| 0x | 48 | da | 00 | # | 91 0x5b |
| 0x | 48 | ff | 00 | # | 92 0x5c |
| 0x | 48 | ff | 00 | # | 93 0x5d |
| 0x | 48 | ff | 00 | # | 94 0x5e |
| 0x | 48 | ff | 00 | # | 95 0x5f |
| 0x | 6d | 6d | 00 | # | 96 0x60 |
| 0x | 6d | 6d | 00 | # | 97 0x61 |
| 0x | 6d | 6d | 00 | # | 98 0x62 |
| 0x | 6d | 6d | 00 | # | 99 0x63 |
| 0x | 6d | 24 | 00 | # | 100 0x64 |
| 0x | 6d | 24 | 00 | # | 101 0x65 |
| 0x | 6d | 24 | 00 | # | 102 0x66 |
| 0x | 6d | 24 | 00 | # | 103 0x67 |
| 0x | 6d | 48 | 00 | # | 104 0x68 |
| 0x | 6d | 48 | 00 | # | 105 0x69 |
| 0x | 6d | 48 | 00 | # | 106 0x6a |
| 0x | 6d | 48 | 00 | # | 107 0x6b |
| 0x | 6d | 6d | 00 | # | 108 0x6c |
| 0x | 6d | 6d | 00 | # | 109 0x6d |
| 0x | 6d | 6d | 00 | # | 110 0x6e |
| 0x | 6d | 6d | 00 | # | 111 0x6f |
| 0x | 6d | 91 | 00 | # | 112 0x70 |
| 0x | 6d | 91 | 00 | # | 113 0x71 |
| 0x | 6d | 91 | 00 | # | 114 0x72 |
| 0x | 6d | 91 | 00 | # | 115 0x73 |
| 0x | 6d | b6 | 00 | # | 116 0x74 |
| 0x | 6d | b6 | 00 | # | 117 0x75 |
| 0x | 6d | b6 | 00 | # | 118 0x76 |
| 0x | 6d | b6 | 00 | # | 119 0x77 |
| 0x | 6d | da | 00 | # | 120 0x78 |
| 0x | 6d | da | 00 | # | 121 0x79 |
| 0x | 6d | da | 00 | # | 122 0x7a |
| 0x | 6d | da | 00 | # | 123 0x7b |
| 0x | 6d | ff | 00 | # | 124 0x7c |
| 0x | 6d | ff | 00 | # | 125 0x7d |
| 0x | 6d | ff | 00 | # | 126 0x7e |
| 0x | 6d | ff | 00 | # | 127 0x7f |
| 0x | 91 | 91 | 00 | # | 128 0x80 |
| 0x | 91 | 91 | 00 | # | 129 0x81 |
| 0x | 91 | 91 | 00 | # | 130 0x82 |
| 0x | 91 | 91 | 00 | # | 131 0x83 |
| 0x | 91 | 24 | 00 | # | 132 0x84 |
| 0x | 91 | 24 | 00 | # | 133 0x85 |
| 0x | 91 | 24 | 00 | # | 134 0x86 |
| 0x | 91 | 24 | 00 | # | 135 0x87 |
| 0x | 91 | 48 | 00 | # | 136 0x88 |
| 0x | 91 | 48 | 00 | # | 137 0x89 |
| 0x | 91 | 48 | 00 | # | 138 0x8a |
| 0x | 91 | 48 | 00 | # | 139 0x8b |
| 0x | 91 | 6d | 00 | # | 140 0x8c |
| 0x | 91 | 6d | 00 | # | 141 0x8d |
| 0x | 91 | 6d | 00 | # | 142 0x8e |
| 0x | 91 | 6d | 00 | # | 143 0x8f |
| 0x | 91 | 91 | 00 | # | 144 0x90 |
| 0x | 91 | 91 | 00 | # | 145 0x91 |

-continued

| | THREE BUFFS PALETTE | | | | |
|---|---|---|---|---|---|
| | R | G | B | | INDEX |
| 0x | 91 | 91 | 00 | # | 146 0x92 |
| 0x | 91 | 91 | 00 | # | 147 0x93 |
| 0x | 91 | b6 | 00 | # | 148 0x94 |
| 0x | 91 | b6 | 00 | # | 149 0x95 |
| 0x | 91 | b6 | 00 | # | 150 0x96 |
| 0x | 91 | b6 | 00 | # | 151 0X97 |
| 0X | 91 | da | 00 | # | 152 0X98 |
| 0x | 91 | da | 00 | # | 153 0x99 |
| 0x | 91 | da | 00 | # | 154 0x9a |
| 0x | 91 | da | 00 | # | 155 0x9b |
| 0x | 91 | ff | 00 | # | 156 0x9c |
| 0x | 91 | ff | 00 | # | 157 0x9d |
| 0x | 91 | ff | 00 | # | 158 0x9e |
| 0x | 91 | ff | 00 | # | 159 0x9f |
| 0x | b6 | b6 | 00 | # | 160 0xa0 |
| 0x | b6 | b6 | 00 | # | 161 0xa1 |
| 0x | b6 | b6 | 00 | # | 162 0xa2 |
| 0x | b6 | b6 | 00 | # | 163 0xa3 |
| 0x | b6 | 24 | 00 | # | 164 0xa4 |
| 0x | b6 | 24 | 00 | # | 165 0xa5 |
| 0x | b6 | 24 | 00 | # | 166 0xa6 |
| 0x | b6 | 24 | 00 | # | 167 0xa7 |
| 0x | b6 | 48 | 00 | # | 168 0xa8 |
| 0x | b6 | 48 | 00 | # | 169 0xa9 |
| 0x | b6 | 48 | 00 | # | 170 0xaa |
| 0x | b6 | 48 | 00 | # | 171 0xab |
| 0x | b6 | 6d | 00 | # | 172 0xac |
| 0x | b6 | 6d | 00 | # | 173 0xad |
| 0x | b6 | 6d | 00 | # | 174 0xae |
| 0x | b6 | 6d | 00 | # | 175 0xaf |
| 0x | b6 | 91 | 00 | # | 176 0xb0 |
| 0x | b6 | 91 | 00 | # | 177 0xb1 |
| 0x | b6 | 91 | 00 | # | 178 0xb2 |
| 0x | b6 | 91 | 00 | # | 179 0xb3 |
| 0x | b6 | b6 | 00 | # | 180 0xb4 |
| 0x | b6 | b6 | 00 | # | 181 0xb5 |
| 0x | b6 | b6 | 00 | # | 182 0xb6 |
| 0x | b6 | b6 | 00 | # | 183 0xb7 |
| 0x | b6 | da | 00 | # | 184 0xb8 |
| 0x | b6 | da | 00 | # | 185 0xb9 |
| 0x | b6 | da | 00 | # | 186 0xba |
| 0x | b6 | da | 00 | # | 187 0xbb |
| 0x | b6 | ff | 00 | # | 188 0xbc |
| 0x | b6 | ff | 00 | # | 189 0xbd |
| 0x | b6 | ff | 00 | # | 190 0xbe |
| 0x | b6 | ff | 00 | # | 191 0xbf |
| 0x | da | da | 00 | # | 192 0xc0 |
| 0x | da | da | 00 | # | 193 0xc1 |
| 0x | da | da | 00 | # | 194 0xc2 |
| 0x | da | da | 00 | # | 195 0xc3 |
| 0x | da | 24 | 00 | # | 196 0xc4 |
| 0x | da | 24 | 00 | # | 197 0xc5 |
| 0x | da | 24 | 00 | # | 198 0xc6 |
| 0x | da | 24 | 00 | # | 199 0xc7 |
| 0x | da | 48 | 00 | # | 200 0xc8 |
| 0x | da | 48 | 00 | # | 201 0xc9 |
| 0x | da | 48 | 00 | # | 202 0xca |
| 0x | da | 48 | 00 | # | 203 0xcb |
| 0x | da | 6d | 00 | # | 204 0xcc |
| 0x | da | 6d | 00 | # | 205 0xcd |
| 0x | da | 6d | 00 | # | 206 0xce |
| 0x | da | 6d | 00 | # | 207 0xcf |
| 0x | da | 91 | 00 | # | 208 0xd0 |
| 0x | da | 91 | 00 | # | 209 0xd1 |
| 0x | da | 91 | 00 | # | 210 0xd2 |
| 0x | da | 91 | 00 | # | 211 0xd3 |
| 0x | da | b6 | 00 | # | 212 0xd4 |
| 0x | da | b6 | 00 | # | 213 0xd5 |
| 0x | da | b6 | 00 | # | 214 0xd6 |
| 0x | da | b6 | 00 | # | 215 0xd7 |
| 0x | da | da | 00 | # | 216 0xd8 |
| 0x | da | da | 00 | # | 217 0xd9 |
| 0x | da | da | 00 | # | 218 0xda |
| 0x | da | da | 00 | # | 219 0xdb |
| 0x | da | ff | 00 | # | 220 0xdc |
| 0x | da | ff | 00 | # | 221 0xdd |

-continued

| | THREE BUFFS PALETTE | | | | |
|---|---|---|---|---|---|
| | R | G | B | | INDEX |
| 0x | da | ff | 00 | # | 222 0xde |
| 0x | da | ff | 00 | # | 223 0xdf |
| 0x | ff | ff | 00 | # | 224 0xe0 |
| 0x | ff | ff | 00 | # | 225 0xe1 |
| 0x | ff | ff | 00 | # | 226 0xe2 |
| 0x | ff | ff | 00 | # | 227 0xe3 |
| 0x | ff | 24 | 00 | # | 228 0xe4 |
| 0x | ff | 24 | 00 | # | 229 0xe5 |
| 0x | ff | 24 | 00 | # | 230 0xe6 |
| 0x | ff | 24 | 00 | # | 231 0xe7 |
| 0x | ff | 48 | 00 | # | 232 0xe8 |
| 0x | ff | 48 | 00 | # | 233 0xe9 |
| 0x | ff | 48 | 00 | # | 234 0xea |
| 0x | ff | 48 | 00 | # | 235 0xeb |
| 0x | ff | 6d | 00 | # | 236 0xec |
| 0x | ff | 6d | 00 | # | 237 0xed |
| 0x | ff | 6d | 00 | # | 238 0xee |
| 0x | ff | 6d | 00 | # | 239 0xef |
| 0x | ff | 91 | 00 | # | 240 0xf0 |
| 0x | ff | 91 | 00 | # | 241 0xf1 |
| 0x | ff | 91 | 00 | # | 242 0xf2 |
| 0x | ff | 91 | 00 | # | 243 0xf3 |
| 0x | ff | b6 | 00 | # | 244 0xf4 |
| 0x | ff | b6 | 00 | # | 245 0xf5 |
| 0x | ff | b6 | 00 | # | 246 0xf6 |
| 0x | ff | b6 | 00 | # | 247 0xf7 |
| 0x | ff | da | 00 | # | 248 0xf8 |
| 0x | ff | da | 00 | # | 249 0xf9 |
| 0x | ff | da | 00 | # | 250 0xfa |
| 0x | ff | da | 00 | # | 251 0xfb |
| 0x | ff | ff | 00 | # | 252 0xfc |
| 0x | ff | ff | 00 | # | 253 0xfd |
| 0x | ff | ff | 00 | # | 254 0xfe |
| 0x | ff | ff | 00 | # | 255 0xff |

Figure 8:
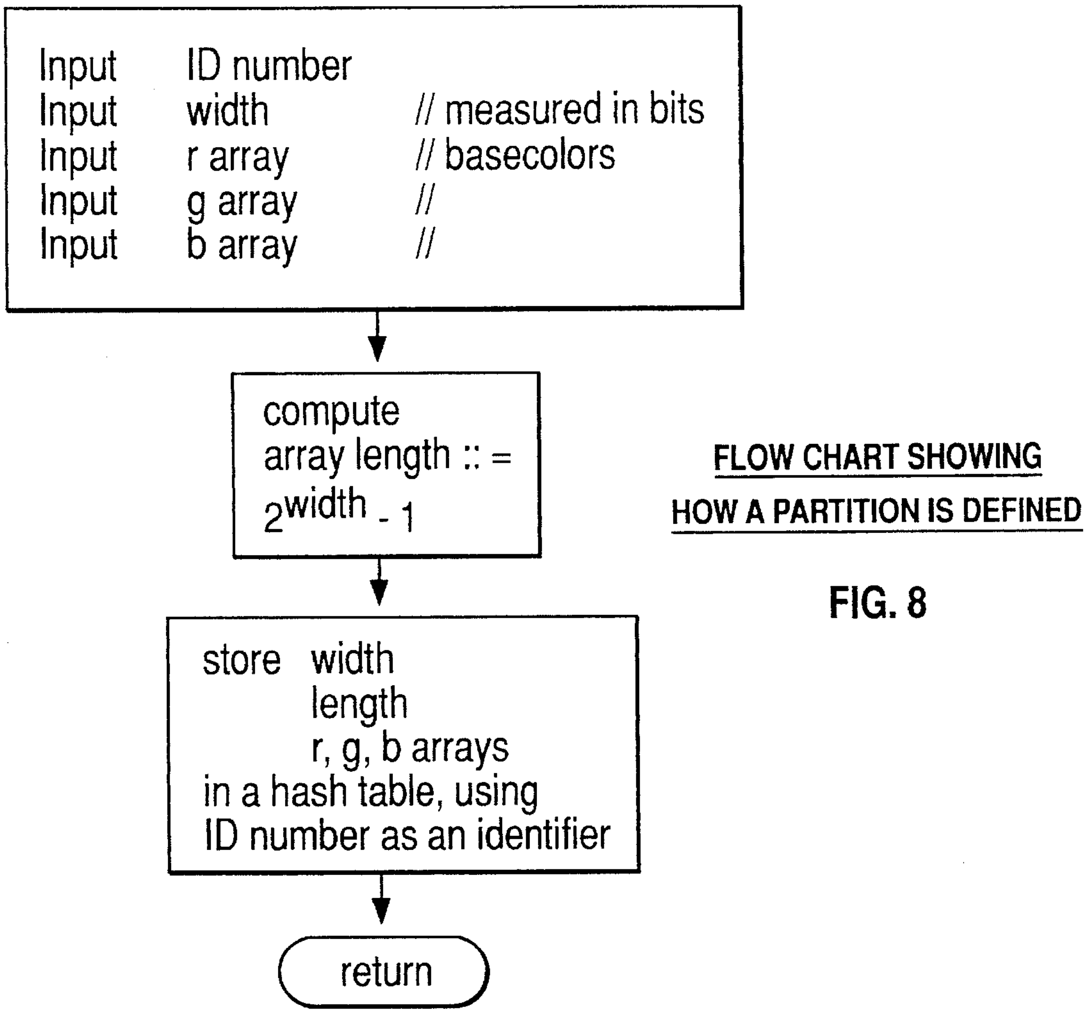
FIG. 8–13 schematically depict by flow diagram program operations suitable to practice the invention.
Figure 9:
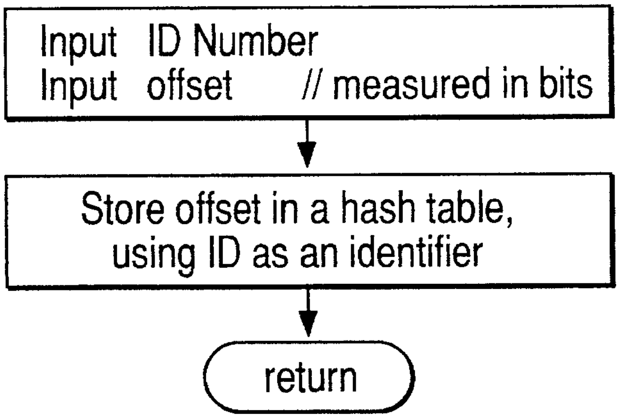
Figure 10:
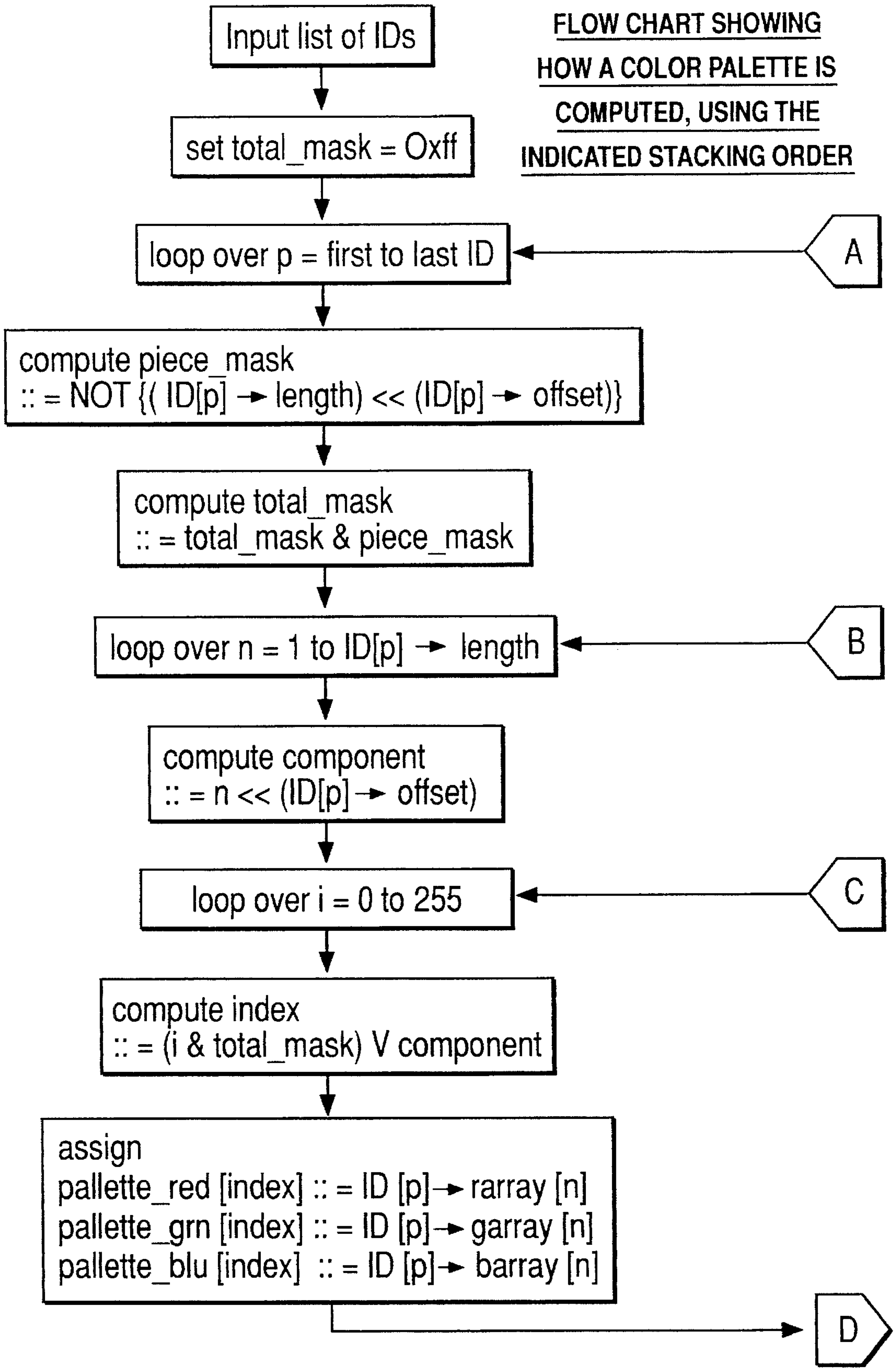
Figure 11:
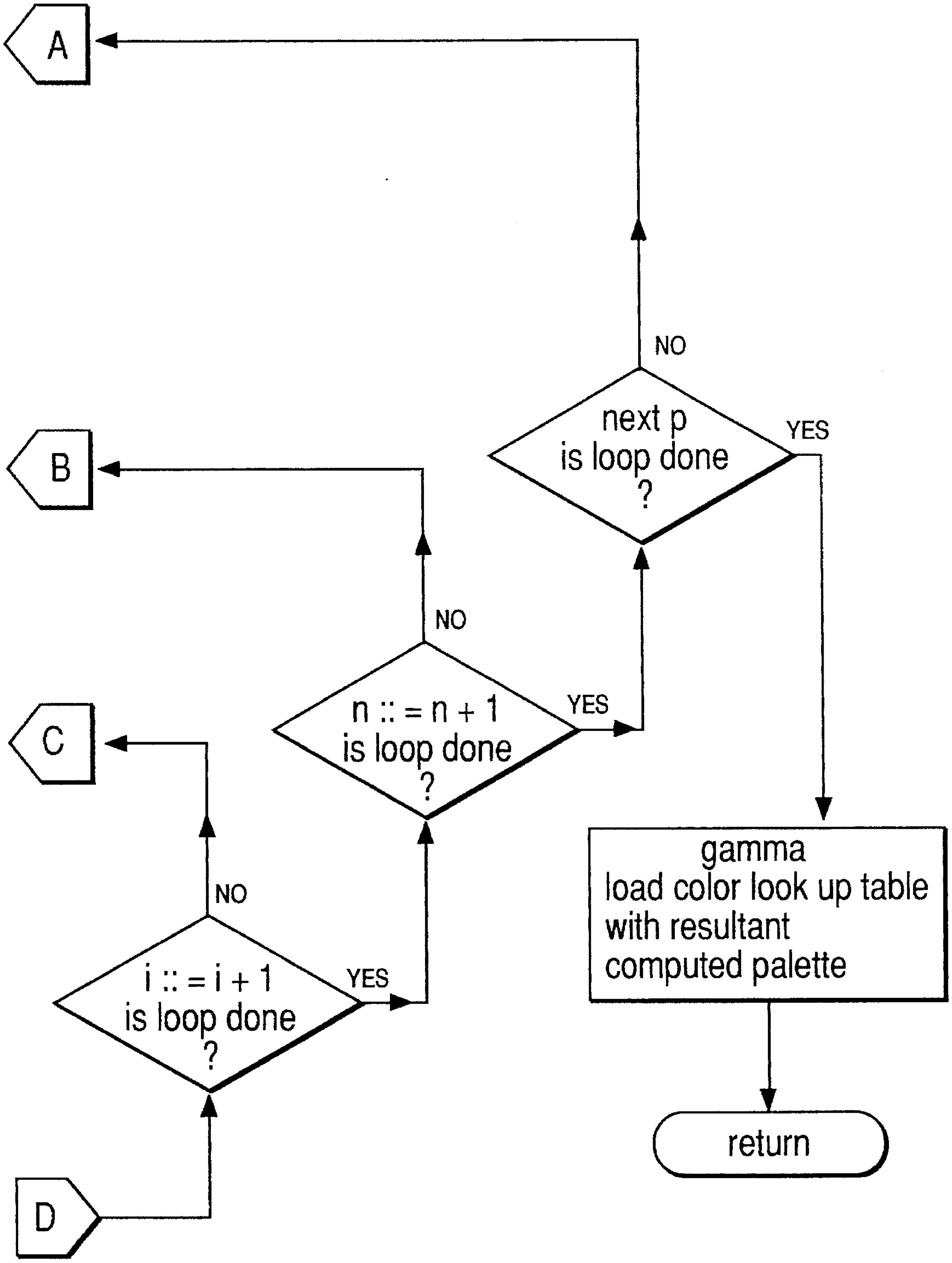
Figure 12:
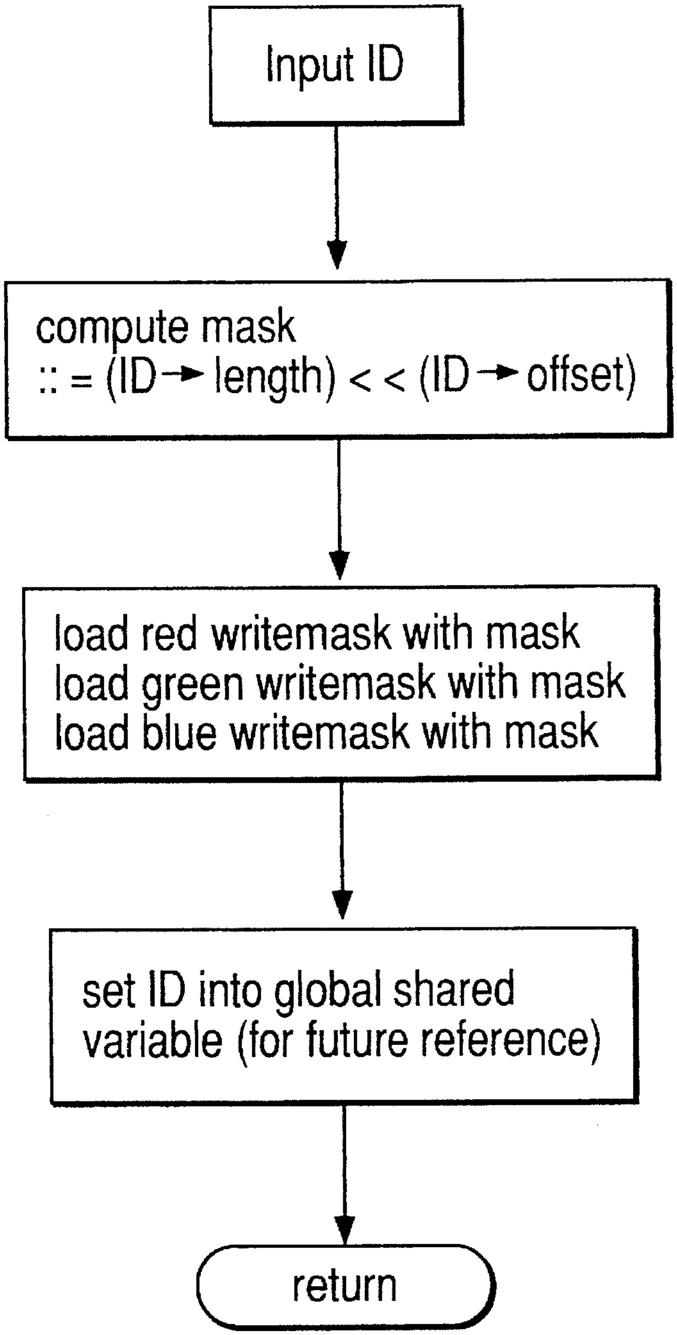
Figure 13:
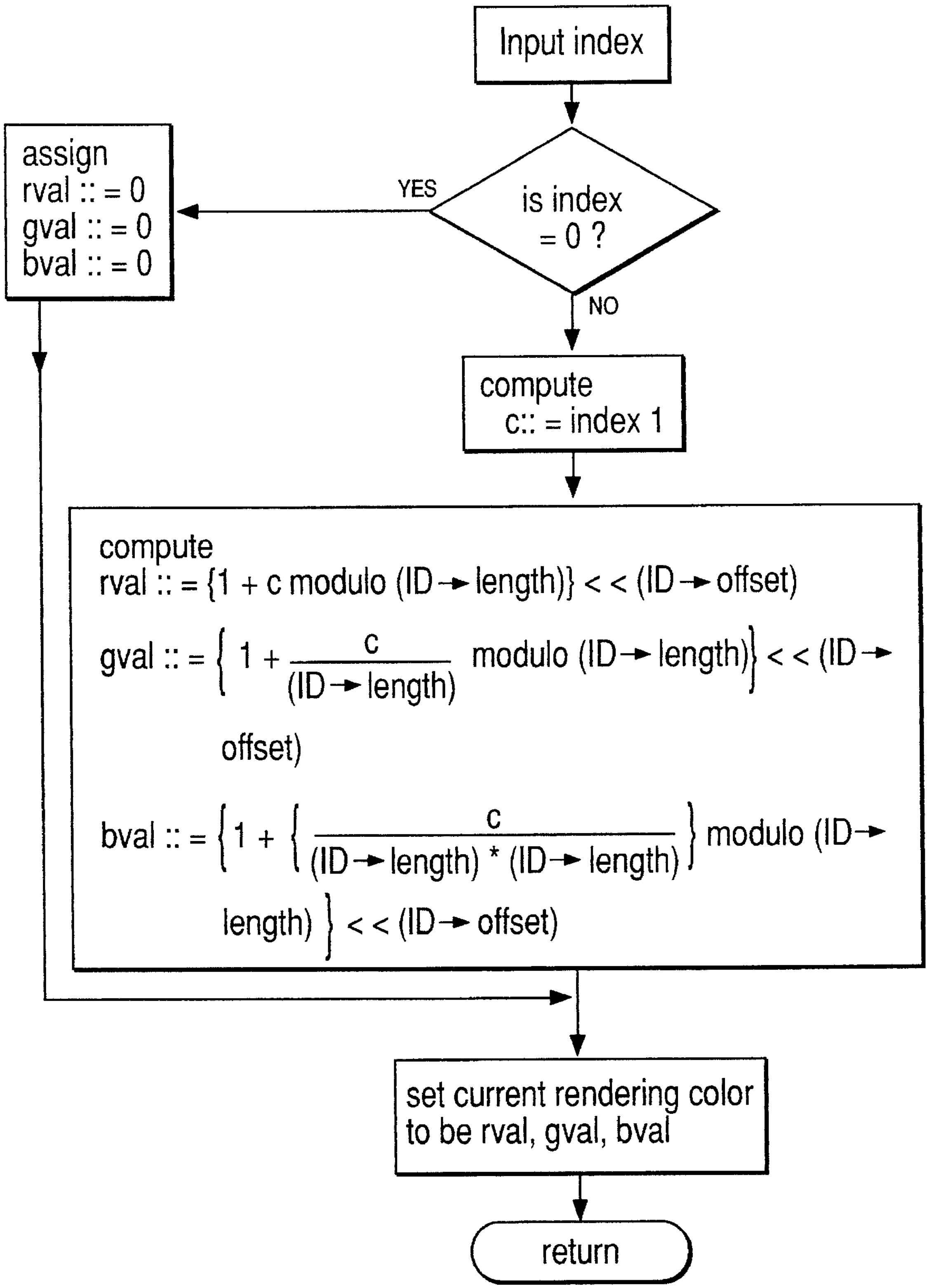

FIGS. 8–13 schematically illustrate by flow diagram the operations performed by code in a program suitable to implement the invention on the aforemention RISC System/6000 workstation. FIG. 14 defines the nomenclature used in FIGS. 8–13. In particular, FIG. 8 depicts the operations involved in defining a partition; FIG. 9 depicts the operations involved in binding an offset; FIGS. 10 and 11 depict the operations involved in computing a color palette; FIG. 12 depicts the operations involved in masking and indicating partitions; and FIG. 13 depicts the operations involved in color setting.

Figure 15:
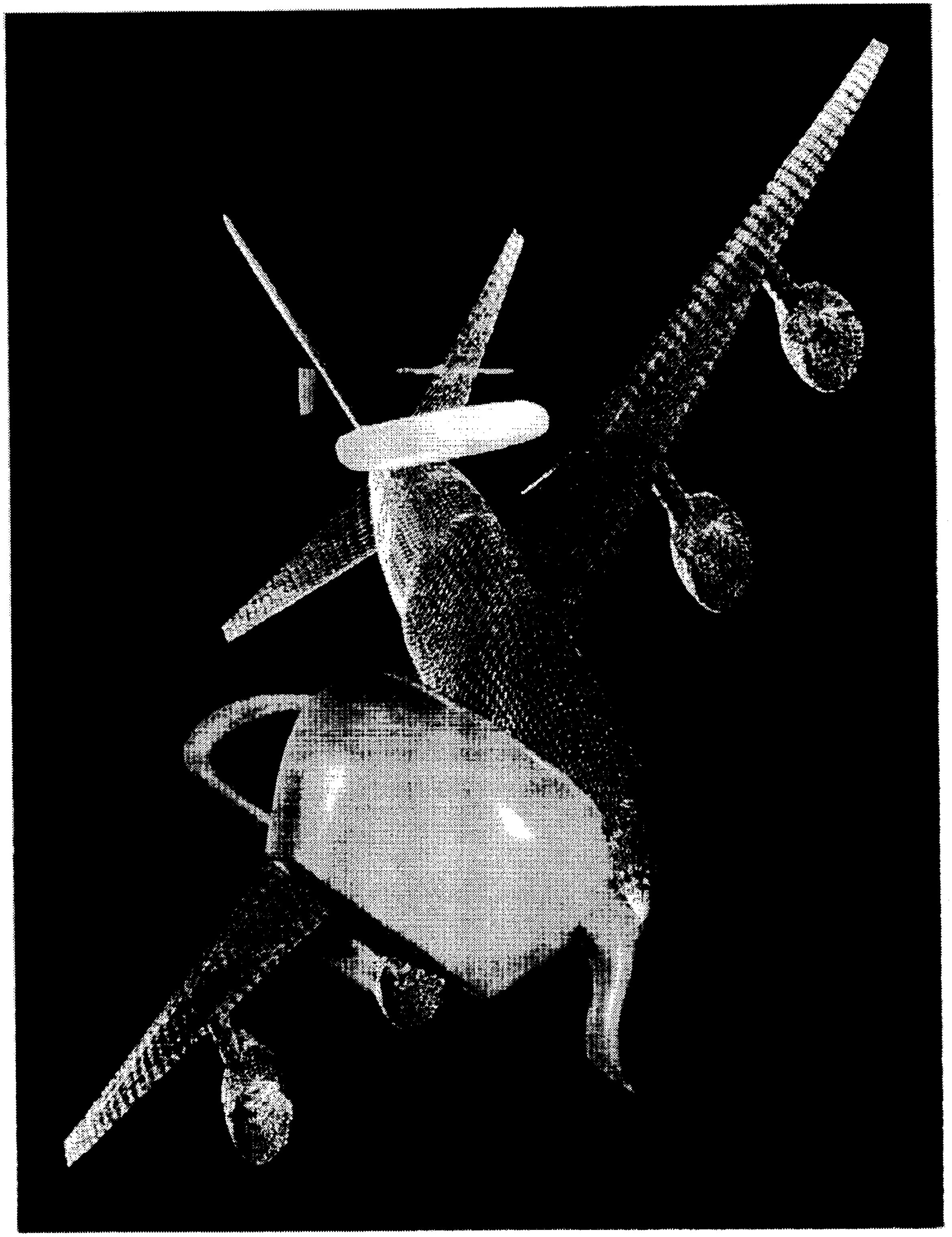
FIG. 15 illustrates animation involving complex three-dimensional images.

FIG. 15 graphically illustrates some of the implications of the present invention. Namely, if the images in FIG. 15 are generated and stored in the composite using conventional graphics practices and a contemporary gamma ramp frame buffer type workstation, the 30 to 40 thousand triangles needed to render the shape of the 3-D aircraft image would require between a minimum of 0.1 seconds (for a very high speed workstation) to 2 seconds (for a moderate speed workstation) to regenerate with each movement of each overlapping other image. Since the tea pot is also a relatively complex image, involving approximately 5 thousand triangles to render in shaded color, the time expended merely to render it would normally eliminate real-time, user interactive capability. Therefore, relative and real-time movement of the combination of the color shaded tea pot, wine glass and torroid in the context of the aircraft would be substantially impossible were it not for the partitioning of the frame buffer bit planes as defined by the present invention. It is in the context of such simulations involving complex three dimensional color shaded objects that the invention finds particular value. The alternatives are expensive and functionally specialized.

Although the invention has been described and illustrated by way of specific embodiments the underlying methods, systems and programs should be understood to extend to all variants defined by the claims set forth hereinafter.

We claim:

1. A method for partitioning a gamma ramp frame buffer using color pallets in an associated digital to analog converter, comprising the steps of:

scaling and off-setting data for two or more patterns to be rendered into the gamma ramp frame buffer;

dividing the bit planes of the gamma ramp frame buffer into two or more groupings;

rendering first data into a first gamma ramp grouping of bit planes in the frame buffer while selectively masking other bit planes, the first data representing the color or transparency of a first pattern at a first pixel position;

rendering second data into a second gamma ramp grouping of bit planes of the frame buffer while selectively masking other bit planes, the second data representing the color or transparency of a second pattern at the first pixel position; and loading a set of gamma ramp color pallets with digital to analog conversion data which selectively match the color or transparency of each respective grouping of bit planes.

2. The method recited in claim 1, wherein the scaling and off-setting adjusts for bit count and bit significance in the bit planes of the frame buffer.

3. The method recited in claim 2, wherein the first pattern data is derived by dithering.

4. The method recited in claim 3, wherein the first pattern data relates to an animated image.

5. The method recited in claim 2, wherein the second pattern data is derived by dithering.

6. The method recited in claim 5, wherein the second pattern data relates to an animated image.

7. Apparatus for generating an RGB gamma ramp frame buffer image, comprising:

a video display;

a graphics processor connected to the video display;

a multiple bit plane gamma ramp frame buffer connected to the graphics processor;

means for scaling and off-setting data for a first pattern;

means for dividing the bit planes of the gamma ramp frame buffer into two or more groupings;

means for rendering first pattern data into a first gamma ramp grouping of bit planes in the frame buffer while selectively masking other bit planes, the first pattern data representing the color or transparency of a first pattern at a first pixel position;

means for rendering second pattern data into a second gamma ramp grouping of bit planes in the frame buffer while selectively masking other bit planes, the second data representing the color or transparency of a second pattern at the first pixel position;

means for loading a set of gamma ramp color pallets with digital to analog conversion data which selectively match the color or transparency of each respective grouping of bit planes; and means for generating selective RGB signals for the video display responsive to the transparency and color data in the first and second groupings of bit planes.

8. The apparatus recited in claim 7, wherein the means for generating causes the first pattern to overlay the second patterns as appears on the video display.

* * * * *